(12) United States Patent
Kowada et al.

(10) Patent No.: US 8,393,146 B2
(45) Date of Patent: Mar. 12, 2013

(54) EXHAUST EMISSION CONTROL DEVICE

(75) Inventors: Minoru Kowada, Hino (JP); Hisaki Torisaka, Hino (JP); Heimo Schreier, Graz (AT); Harald Grantner, Graz (AT); Thomas Obenaus, Graz (AT)

(73) Assignees: Hino Motors, Ltd., Hino-shi (JP); AVL List GmbH, Graz (AT)

( * ) Notice: Subject to any disclaimer, the term of this patent is extended or adjusted under 35 U.S.C. 154(b) by 407 days.

(21) Appl. No.: 12/672,045

(22) PCT Filed: Mar. 17, 2008

(86) PCT No.: PCT/JP2008/000607
§ 371 (c)(1),
(2), (4) Date: Feb. 3, 2010

(87) PCT Pub. No.: WO2009/019806
PCT Pub. Date: Feb. 12, 2009

(65) Prior Publication Data
US 2011/0107750 A1   May 12, 2011

(30) Foreign Application Priority Data
Aug. 8, 2007 (JP) ................... 2007-206099

(51) Int. Cl.
*F01N 3/00* (2006.01)

(52) U.S. Cl. .......................... 60/297; 60/299

(58) Field of Classification Search .............. 60/297, 60/299, 322, 323, 324; 181/264, 268, 275
See application file for complete search history.

(56) References Cited

U.S. PATENT DOCUMENTS

| 6,241,044 B1 | 6/2001 | Nishiyama et al. | |
| 2003/0079467 A1* | 5/2003 | Liu et al. | 60/286 |

(Continued)

FOREIGN PATENT DOCUMENTS

| GB | 2 346 413 A | 8/2000 |
| JP | 4 103818 | 4/1992 |
| JP | 2001-271628 | 10/2001 |
| JP | 2002 266624 | 9/2002 |
| JP | 2004 263594 | 9/2004 |

OTHER PUBLICATIONS

U.S. Appl. No. 12/678,498, filed Mar. 17, 2010, Torisaka, et al.

(Continued)

*Primary Examiner* — Thomas Denion
*Assistant Examiner* — Patrick Maines
(74) *Attorney, Agent, or Firm* — Oblon, Spivak, McClelland, Maier & Neustadt, L.L.P.

(57) ABSTRACT

An exhaust emission control device is provided which is compact in size and has favorable dispersibility of exhaust gas from a muffling structure 2 to an oxidation catalyst 3. The muffling structure 2 arranged upstream of the oxidation catalyst in a direction D of gas flow has a dispersion plate 6 for dividing the interior of the casing 5 into dispersion chambers 7a and 7b upstream and downstream in the direction D of gas flow, respectively, and an inner pipe 8 inserted from outside of and into the chamber 7a and with a tip end fixed to the dispersion plate 6 and circumferentially formed with pores 9a, 9b, 9c and 9d having diameters gradually reduced in the order in the direction D of gas flow from upstream to downstream. The dispersion plate 6 facing the dispersion chambers 7a and 7b is formed with a plurality of radially-outward-larger-diametered and radially-inward-smaller-diametered pores 14, 15 and 16.

1 Claim, 5 Drawing Sheets

U.S. PATENT DOCUMENTS

| | | | |
|---|---|---|---|
| 2003/0159414 A1* | 8/2003 | Cheng et al. | 55/418 |
| 2003/0217535 A1* | 11/2003 | Kanematsu | 55/418 |
| 2004/0040782 A1* | 3/2004 | Frederiksen | 181/258 |
| 2007/0077190 A1* | 4/2007 | Ohno | 423/345 |
| 2007/0169467 A1* | 7/2007 | Shirai et al. | 60/286 |

OTHER PUBLICATIONS

Supplementary Search Report issued Mar. 30, 2011 in Europe Application No. 08 72 0492.

* cited by examiner

EXHAUST EMISSION CONTROL DEVICE

TECHNICAL FIELD

The present invention relates to an exhaust emission control device compact in size and with favorable dispersibility of exhaust gas from a muffling structure to an oxidation catalyst.

BACKGROUND ART

Of recent years, some exhaust emission control devices in, for example, exhaust system for diesel engine have muffling structure. An example of such exhaust emission control device is shown in FIGS. 1-3. In the figures, reference numeral 1 denotes an exhaust emission control device. The exhaust emission control device 1 comprises a muffling structure 2 arranged upstream in a direction D of gas flow, an oxidation catalyst 3 arranged downstream of the muffling structure 2 in the direction D of gas flow and a particulate filter 4 arranged downstream of the catalyst 3 in the direction D of gas flow. The muffling structure 2, the oxidation catalyst 3 and the particulate filter 4 are encased in a cylindrical casing 5.

The oxidation catalyst 3 is carried by, for example, a cordierite or other ceramic carrier which provides a flow-through type honeycomb structure. The particulate filter 4 comprises, for example, a filter body (not shown) in the form of a porous honeycomb structure made of ceramic such as cordierite and having lattice-like compartmentalized passages. Alternate ones of the passages have plugged inlets and the remaining passages with unplugged open inlets are plugged at their outlets. Thus, only the exhaust gas passing through the thin porous compartment walls is discharged downstream and particulates are captured on inner surfaces of the compartment walls.

The muffling structure 2 has a dispersion chamber in the casing 5 upstream in the direction D of gas flow and having a dispersion plate 6 intermediately in the chamber in the direction D of gas flow. Thus, the dispersion chamber is divided into dispersion chambers 7a and 7b upstream and downstream in the direction D of gas flow, respectively. Inserted from outside of and into the dispersion chamber 7a upstream in the direction D of gas flow is an inner pipe 8 which has a tip end fixed to the dispersion plate 6.

A portion of the inner pipe 8 within the dispersion chamber 7a is formed with a plurality of smaller- and equi-diameter pores 9 spaced apart from each other circumferentially and in the direction D of gas flow with predetermined pitches. The dispersion plate 6 facing the chambers 7a and 7b is formed with a plurality of circumferentially equidistant larger-diameter pores 10 in a circle, and is also formed with a plurality of pores 11 and 12 each having a diameter smaller than that of the pore 10 and in circles different from that in which the pores 10 are arranged. The dispersion plate 6 is further formed with a plurality of pores 13 with a diameter smaller than that of the pores 10 and at a position corresponding to an inner diameter region of the inner pipe 8. The dispersion plate 6 may be formed with pores in various other patterns.

The exhaust gas from the engine into the inner pipe 8 in the muffling structure 2 partly flows via the pores 9 into the dispersion chamber 7a and thus into the dispersion chamber 7b via the pores 10, 11 and 12 on the dispersion plate 6 and remaining part of the exhaust gas flows via the pores 13 on the plate 6 into the dispersion chamber 7b. This muffles the exhaust gas flow.

The exhaust gas thus flowing into the dispersion chamber 7b passes through the oxidation catalyst 3 into the particulate filter 4 where the exhaust gas is freed from emissions such as particulates and is discharged downstream. In this situation, if the temperature of the exhaust is lower than a predetermined temperature, fuel (HC) for addition is added into the exhaust system upstream of the inner pipe 8 in the direction D of gas flow and the added fuel brings about oxidation reaction on the oxidation catalyst so that the resultant reaction heat elevates in temperature the exhaust; as a result, the emissions such as particulates captured by the particulate filter 4 in clogging manner are burned out by the heat, thereby regenerating the particulate filter 4.

Patent Literature 1 is a prior art reference which discloses an exhaust emission control device with a muffler.
[Patent Literature 1] 2004-263594A

SUMMARY OF INVENTION

Technical Problems

In the device shown in FIGS. 2 and 3, the flow rates per unit time of the exhaust discharged via the respective pores 9 depend on inner pressure distribution in the inner pipe 8; therefore, when the pores 9 on the inner pipe 8 are of smaller- and equi-diameter, the exhaust resistance cannot be unformed in the respective pores 9 upstream and downstream in the direction of gas flow; that is, pressure losses in the pores 9 upstream and downstream in the direction D of gas flow are larger and smaller, respectively. Thus, in discharge of the exhaust gas from the limited space as in the inner pipe 8 via the pores 9 into the dispersion chamber 7a, the flow rate cannot be uniformed; as a result, the flow rate of the exhaust gas per unit time via the pores 9 is smaller upstream in the direction D of gas flow and is increased as the exhaust gas flows downstream.

Thus, the exhaust gas through the dispersion chamber 7a and the pores 10, 11 and 12 of the dispersion plate 6 to the dispersion chamber 7b is insufficient in flow rate at and in the vicinity of an outer periphery of the plate 6, which deteriorates dispersibility of the exhaust gas to the oxidation catalyst, and thus removal of the particulates by the particulate filter 4 cannot be conducted efficiently.

In the device of Patent Literature 1, no diameters of the pores on the pipe and on the baffle plate are specified and no special attention is paid to the pore diameters; therefore, it may have drawbacks similar to those of the device shown in FIGS. 2 and 3.

The invention was made in view of the above and has its object to provide an exhaust emission control device which is compact in size and has favorable dispersibility of exhaust gas from a muffling structure to an oxidation catalyst.

Solution to Problems

The invention is directed to an exhaust emission control device wherein a muffling structure, a catalyst arranged downstream of said muffling structure in a direction of gas flow and a particulate filter arranged downstream of said catalyst in the direction of gas flow are encased in a casing, said muffling structure comprising a dispersion plate for dividing an interior of said casing into dispersion chambers upstream and downstream in the direction of gas flow, respectively, and an inner pipe inserted from outside of and into the upstream dispersion chamber and with a tip end fixed to said dispersion plate, a portion of said inner pipe within said dispersion chamber being circumferentially formed with a plurality of pores with diameters gradually reduced in the order from upstream to downstream of the gas flow.

In the exhaust emission control device of the invention, it is preferable that the dispersion plate is formed with a plurality of radially-outward-larger-diametered and radially-inward-smaller-diametered pores.

Advantageous Effects of Invention

According to an exhaust emission control device of the invention, the volume of dispersion chamber is effectively utilized to improve the dispersibility of the exhaust gas, so that dispersion of the exhaust gas flowing into the catalyst can be conducted to uniform the flow rate of the exhaust gas flowing through the catalyst into the particulate filter, thereby improving the efficiency of the particulate filter. Since the dispersibility of the exhaust gas is improved by effectively utilizing the dispersion chamber, the device can be made compact in size.

Figure 1:
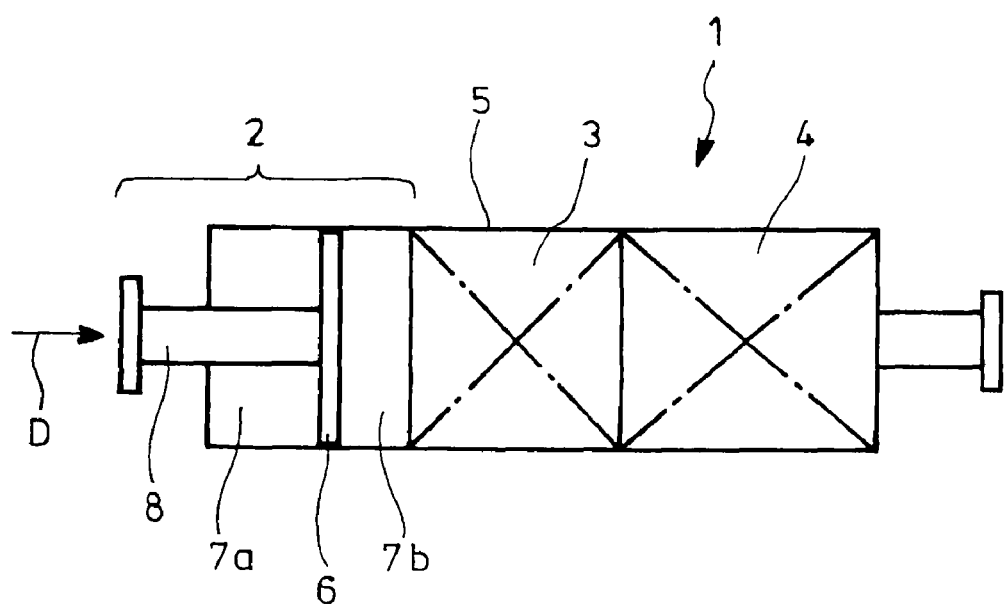
FIG. 1 is a typical schematic diagram of an exhaust emission control device with a muffling structure.

REFERENCE SIGNS LIST 1 exhaust emission control device
2 muffling structure
3 oxidation catalyst (catalyst)
4 particulate filter
5 casing
6 dispersion plate
7a and 7b dispersion chamber
8 inner pipe
9a, 9b, 9c and 9d pore
14 pore
15 pore
16 pore
17 pore
D direction of gas flow
Da, Db, Dc and Dd diameter
D14, D15 and D16 diameter

DESCRIPTION OF EMBODIMENT

An embodiment of the invention will be described in conjunction with attached drawings.

Figure 2:
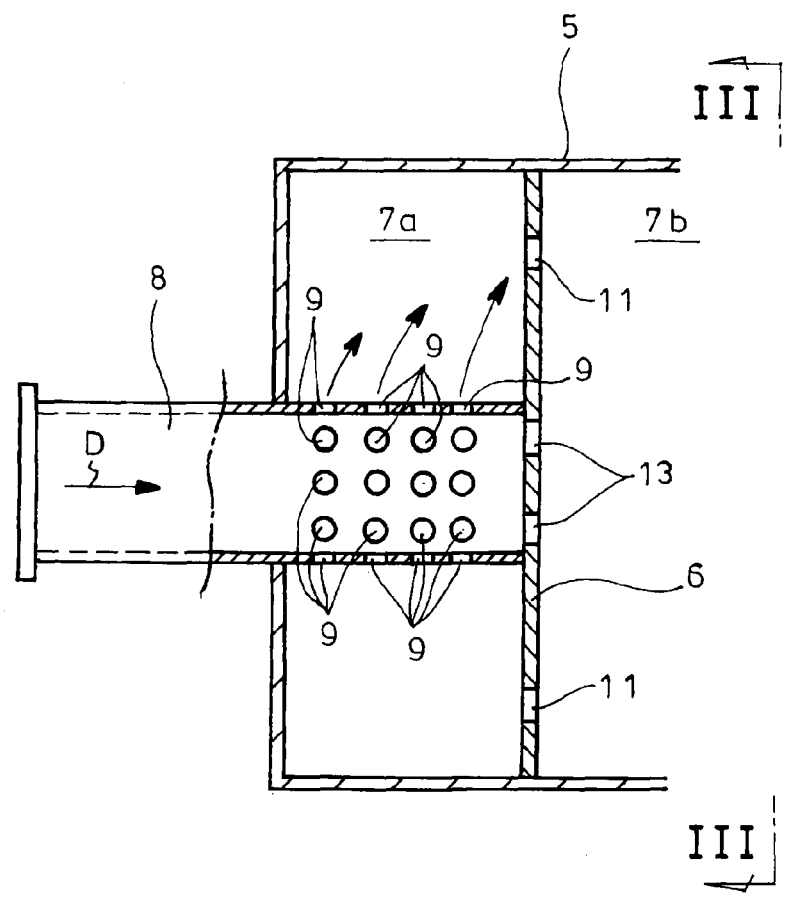
FIG. 2 is a fragmentary vertical section of the conventional exhaust emission control device.
Figure 3:
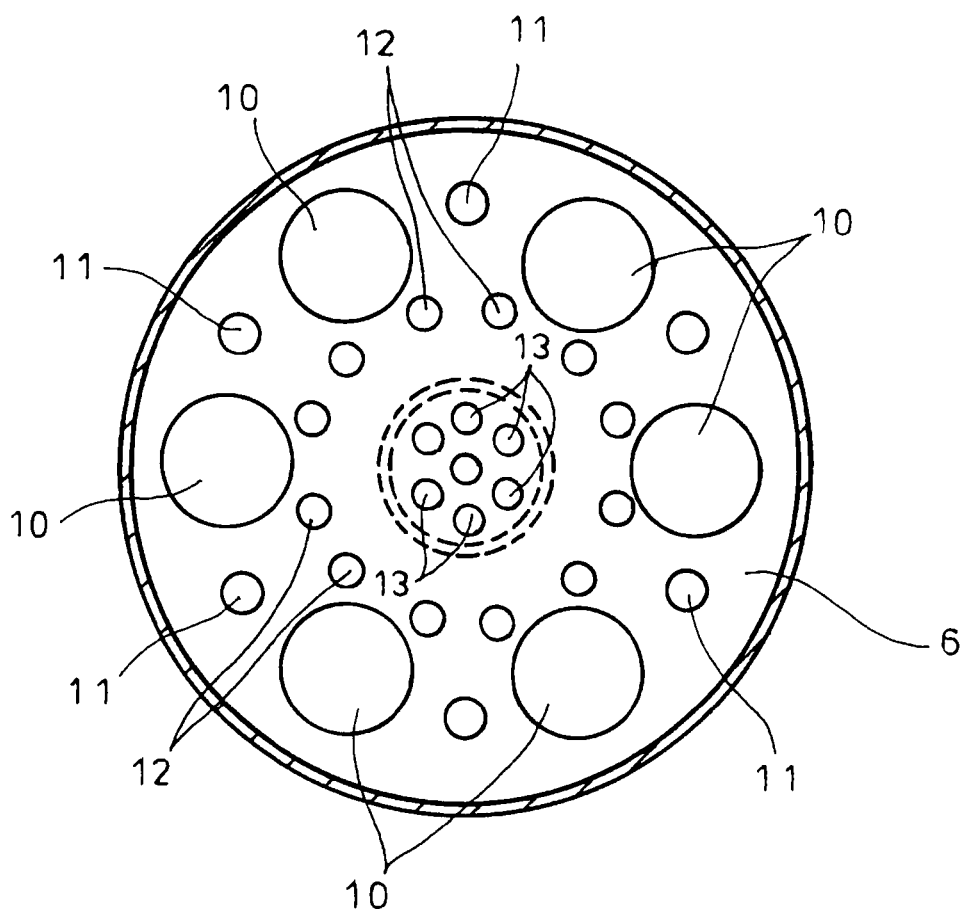
FIG. 3 is a view looking in a direction of arrows III in FIG. 2.
Figure 4:
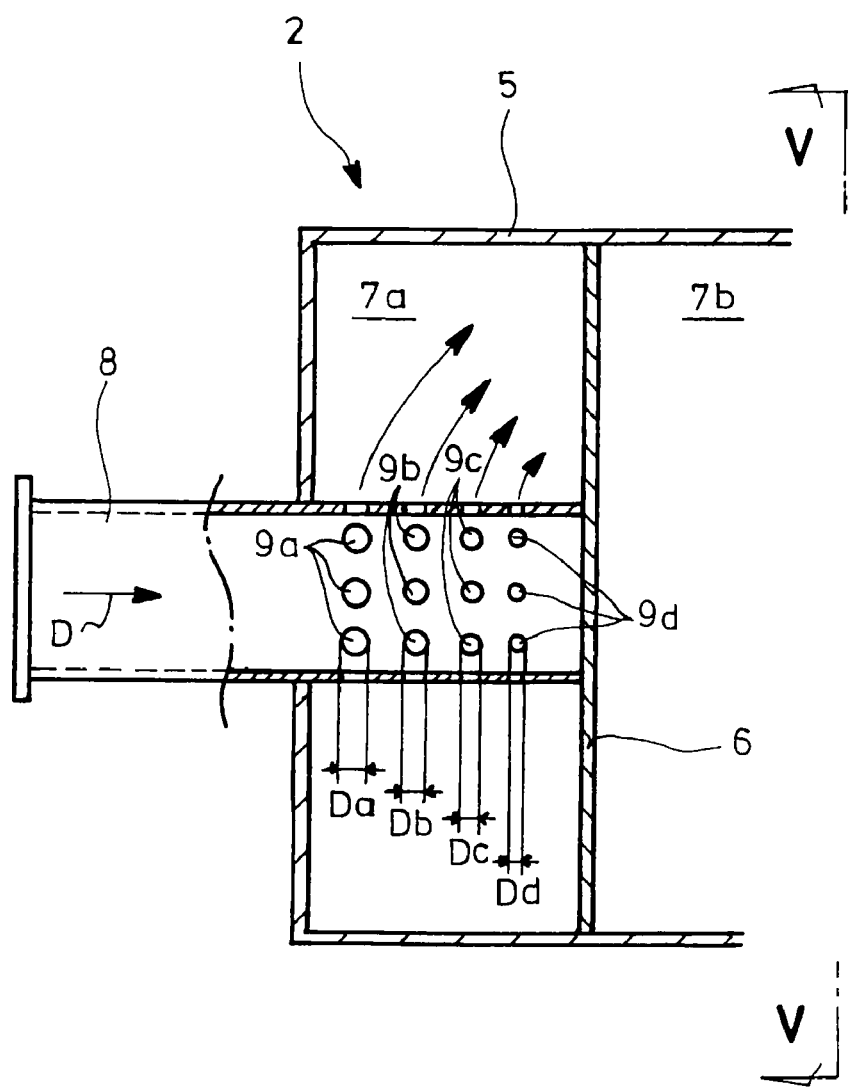
FIG. 4 is a fragmentary vertical section of an embodiment of an exhaust emission control device according to the invention.
Figure 5:
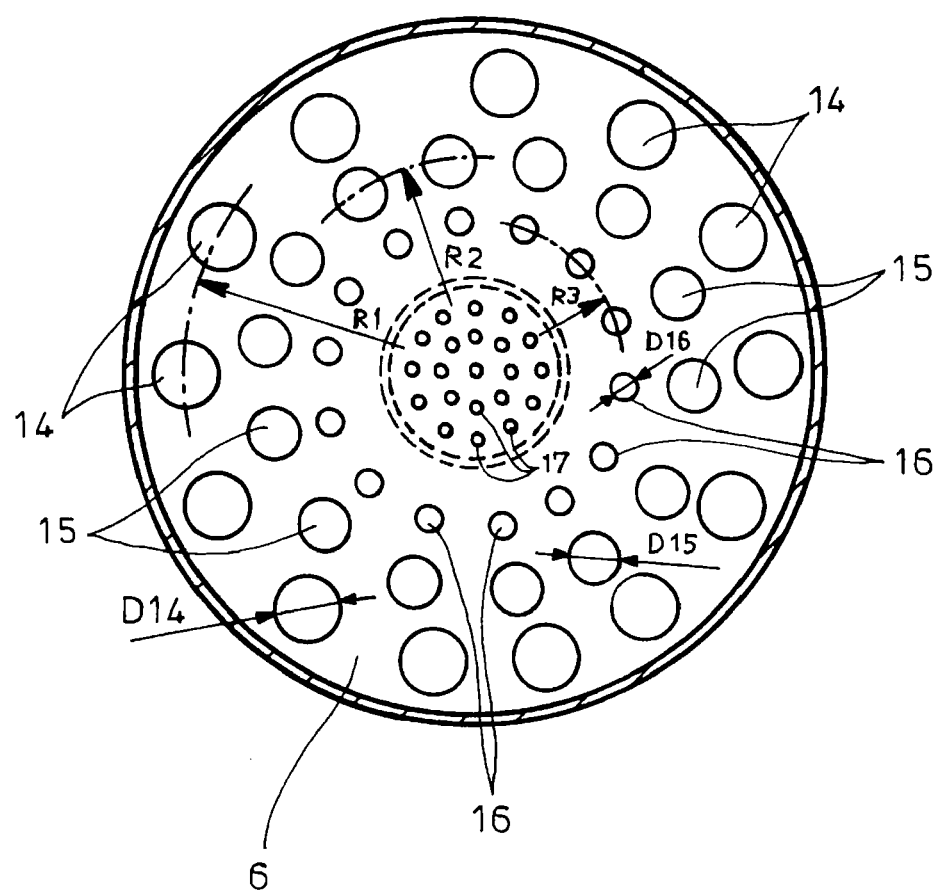
FIG. 5 is a view looking in a direction of arrows V in FIG. 4.

FIGS. 4 and 5 show the embodiment of the invention a fundamental structure of which is similar to that shown in FIG. 1. In the figures, parts similar to those shown in FIGS. 2 and 3 are represented by the same reference numerals.

In the embodiment shown, a portion of the inner pipe 8 within the dispersion chamber 7a is formed with a plurality of pores 9a, 9b, 9c and 9d equidistant from each other circumferentially and in the direction D of gas flow from upstream to downstream. The pores 9a, 9b, 9c and 9d have diameters Da, Db, Dc and Dd, respectively; the diameters of the pores are gradually reduced in the order from upstream to downstream. That is, Da>Db>Dc>Dd.

The dispersion plate 6 facing the dispersion chambers 7a and 7b is formed with a plurality of circumferentially equidistant pores 14, 15 and 16 in respective circles of radius R1, R2 and R3 (R1>R2>R3). The pores 14, 15 and 16 have diameters D14, D15 and D16, respectively; the diameters of the pores are gradually reduced in the order from radially outward to radially inward of the dispersion plate 6; that is, D14>D15>D16. A portion of the dispersion plate 6 facing the inner pipe 8 is formed with a plurality of pores 17 with a diameter smaller than that of the pores 16.

Next, mode of operation of the above-mentioned embodiment will be described.

The exhaust gas from the engine into the inner pipe 8 in the muffling structure 2 partly flows via the pores 9a, 9b, 9c and 9d into the dispersion chamber 7a and then through the dispersion chamber 7a and the pores D14, D15 and D16 into the dispersion chamber 7b; the remaining exhaust flows through the inner pipe 8 via the pores 17 of the dispersion plate 6 into the dispersion chamber 7b. This muffles the exhaust gas flow.

The exhaust gas having flowing into the dispersion chamber 7b passes through the oxidation catalyst 3 into the particulate filter 4 where the exhaust gas is freed from the emissions such as particulates and is discharged downstream. In this situation, when the temperature of the exhaust is lower than a predetermined temperature, fuel for addition (HC) is added into the exhaust system upstream of the inner pipe 8 in the direction D of gas flow so that the added fuel brings about oxidation reaction on the oxidation catalyst 3. The resultant reaction heat elevates in temperature the exhaust, so that the emissions such as particulates captured by the particulate filter 4 in clogging manner are burned out by the heat to regenerate the particulate filter 4.

In the device shown in FIGS. 4 and 5, flow rates of the exhaust discharged via the respective pores 9a-9d depend on inner pressure distribution in the inner pipe 8. However, the diameters of the pores 9a, 9b, 9c and 9d have the relationship of Da>Db>Dc>Dd, so that the exhaust gas flows through the upstream pores more easily than the downstream pores in the direction D of the exhaust gas flow. Thus, the exhaust gas is discharged most through the pores 9a upstream in the direction D of the exhaust gas and the flow rates of the exhaust gas discharged trough the pores are gradually reduced in the order from upstream to downstream, i.e., in the order of the pores 9b, 9c and 9d. As a result, much exhaust gas flows through the outer periphery side of the dispersion chamber 7a and exhaust gas in an amount less than that through the outer periphery side of the chamber flows through the central side of the dispersion chamber 7a. The exhaust gas not discharged through the pores 9a-9d is discharged via the pores 17 of the dispersion plate 6 into the dispersion chamber 7b.

Thus, the exhaust gas discharged via the pores 14, 15, 16 and 17 into the dispersion chamber 7b has flow rates per unit area to the dispersion plate 6 dispersed and substantially uniformed, and passes through the dispersion chamber 7b into the oxidation catalyst 3 and then through the oxidation catalyst 3 into the particulate filter 4.

According to the embodiment, the volume of the dispersion chamber 7a is effectively utilized to improve the dispersibility of the exhaust gas, so that dispersion of the exhaust gas flowing into the oxidation catalyst 3 can be conducted to uniform the flow rate of the exhaust gas flowing through the oxidation catalyst 3 into the particulate filter 4, thereby improving the efficiency of the particulate filter 4. Since the dispersibility of the exhaust gas is improved by effectively utilizing the dispersion chamber 7a, the device can be made compact in size.

It is to be understood that an exhaust emission control device according to the invention is not limited to the above embodiment and that various changes and modifications may be made without departing from the scope of the invention.

The invention claimed is:

1. An exhaust emission control device wherein comprising:
   a muffling structure;
   a catalyst arranged downstream of said muffling structure in a direction of gas flow; and
   a particulate filter arranged downstream of said catalyst in the direction of gas flow encased in a casing, wherein
   said muffling structure includes a dispersion plate for dividing an interior of said casing into dispersion chambers upstream and downstream in the direction of gas flow, respectively, and an inner pipe inserted from outside of and into the upstream dispersion chamber and with a tip end fixed to said dispersion plate,
   a portion of the dispersion plate facing the inner pipe is formed with a plurality of pores;
   a portion of said inner pipe within said dispersion chamber being circumferentially formed with a plurality of pores with diameters gradually reduced in the order from upstream to downstream direction of the gas flow
   a portion of said dispersion plate outward of said inner pipe is formed with a plurality of radially-outward-larger-diametered and radially-inward-smaller-diametered pores, and
   said pores on the dispersion plate facing the inner pipe having uniform diameter smaller than that of the innermost of said pores on the dispersion plate outward of said inner pipe.

* * * * *